US010418909B1

United States Patent
Childs

(10) Patent No.: US 10,418,909 B1
(45) Date of Patent: Sep. 17, 2019

(54) OUTPUT SWITCHED SWITCHING CONVERTER

(71) Applicant: Dialog Semiconductor (UK) Limited, London (GB)

(72) Inventor: Mark Childs, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/043,336

(22) Filed: Jul. 24, 2018

(51) Int. Cl.
*H02M 3/158* (2006.01)
*H02M 3/335* (2006.01)
*H02M 3/137* (2006.01)

(52) U.S. Cl.
CPC ....... *H02M 3/33569* (2013.01); *H02M 3/137* (2013.01); *H02M 3/1582* (2013.01)

(58) Field of Classification Search
CPC . H02M 3/1582; H02M 3/33507; Y02B 40/90; H02J 7/0014; H02J 3/383
USPC ............... 363/17, 39–41, 56.03, 97–98, 132; 323/222, 311
See application file for complete search history.

(56) References Cited

U.S. PATENT DOCUMENTS

| | | | | |
|---|---|---|---|---|
| 6,388,896 B1* | 5/2002 | Cuk | ..................... | H02M 3/1582 363/16 |
| 7,432,614 B2* | 10/2008 | Ma | ......................... | H02M 3/158 307/31 |
| 9,419,522 B1* | 8/2016 | Khaligh | .............. | H02M 3/1582 |
| 9,735,703 B2* | 8/2017 | Dent | ....................... | H02M 7/537 |
| 10,020,660 B2* | 7/2018 | Kang | .................... | H02J 7/0014 |
| 10,090,777 B2* | 10/2018 | Dent | ....................... | H02J 3/383 |
| 2010/0231186 A1 | 9/2010 | Chen et al. | | |
| 2011/0068757 A1 | 3/2011 | Xu et al. | | |
| 2012/0169307 A1 | 7/2012 | Chen et al. | | |
| 2015/0303802 A1* | 10/2015 | Childs | .................. | H02M 3/158 323/271 |

* cited by examiner

*Primary Examiner* — Rajnikant B Patel
(74) *Attorney, Agent, or Firm* — Saile Ackerman LLC; Stephen B. Ackerman

(57) ABSTRACT

A DC-DC switching converter is described, with a high magnetic coupling ratio between coils connected directly to a supply and ground, and with pass-device switches connected directly to an output. The pass-device switches are driven in such a way that the coils are magnetized alternately. The DC-DC switching converter may use multiple output switches, to supply multiple outputs. The DC-DC switching converter may use different turns-ratio on the coils, to adjust the duty-cycle of the switching converter operates, for a given supply voltage to output voltage ratio.

17 Claims, 8 Drawing Sheets

OUTPUT SWITCHED SWITCHING CONVERTER

BACKGROUND

Field

The disclosure relates generally to a DC-DC switching converter, where there is a magnetic coupling between coils, and pass-device switches are driven in such a way that the coils are magnetized alternately.

Description

FIG. 1 illustrates traditional DC-DC switching converter design 100, using two switches connected directly to the supply power and ground. The two switches, PMOS and NMOS, (or one switch and a diode), are connected directly to the supply power Vdd and ground Vss respectively, with their common outputs connected to inductor LOUT. The output voltage is Vout, across output capacitor Cout. In operation the high-side device (usually a PMOS) turns on, and the current in the inductor ramps up. When the high-side device is turned off, the low-side device (usually an NMOS) is turned on, and the current in the inductor ramps down.

FIG. 2 shows an extension to the basic switching converter architecture, with SIDO (Single-Inductor-Dual-Output) buck converter 200. The two switches, PMOS and NMOS, are connected directly to the supply power Vdd and ground Vss respectively, with their common outputs connected to inductor LOUT. The SIDO switching converter adds a multiplex, with switches S1 and S2, that can switch the output current onto output capacitors Cout1 and Cout2, for output voltage Vout1 and Vout2 respectively.

The SIDO scheme of FIG. 2 can be extended to any number of outputs, with a SIMO (Single-Inductor-Multiple-Outputs) scheme, adding additional switches and output channels to the multiplexer. One key drawback of the SIDO (and SIMO) architecture is that the multiplexer places an additional switch in series with the output current, eroding efficiency, especially at high output current.

Since each additional switch has a finite resistance, and current is provided to the load through that resistance, the power lost in each additional switch is given by $P=I^2R$ (where I is the load current and R is the switch resistance). Each additional switch therefore adds a loss to the convertor, reducing efficiency. Minimizing the number of switches in the power path is always beneficial.

SUMMARY

An object of the disclosure is to provide a DC-DC switching converter, with magnetic coupling between coils, and pass-device switches driven in such a way that the coils are magnetized alternately.

A further object of the disclosure is to provide a DC-DC switching converter, that does not place an additional switch in series with pass-devices when using either a SIDO (Single-Inductor-Multiple-Outputs) or SIMO (Single-Inductor-Multiple-Outputs) scheme.

Still further, another object of the disclosure is to provide a DC-DC switching converter using different turns-ratio on two magnetically coupled coils, to adjust the duty-cycle for a given supply-voltage to output-voltage ratio, independent of the input-voltage to output-voltage conversion ratio.

Still further, another object of the disclosure is to provide a switching converter architecture with improved efficiency and reduced silicon area footprint required to implement the design.

To accomplish the above and other objects, an output switched DC-DC switching converter is disclosed, comprising a first inductor coil connected directly between a supply and a high-side pass-device switch, and a second inductor coil connected directly between ground and a low-side pass-device switch. The output switched DC-DC switching converter is further comprised of the high-side pass-device switch and the low-side pass-device switch being connected directly to an output. The output switched DC-DC switching converter is further comprised of the first inductor coil and the second inductor coil being magnetically coupled. The output switched DC-DC switching converter is further comprised of the first inductor coil and the second inductor coil being driven in such a way that the first inductor coil and the second inductor coil are magnetized alternately.

The above and other objects are further achieved by a method for operating an output switched DC-DC switching converter. The steps include providing for a first inductor coil connected directly between a supply and a high-side pass-device switch, and a second inductor coil connected directly between ground and a low-side pass-device switch. The steps also include providing for the high-side pass device switch and the low-side pass-device switch connected together to a converter output. The steps also include providing for the first inductor coil and the second inductor coil to be magnetically coupled. The steps also include providing for the first inductor coil and the second inductor coil driven in such a way that the first inductor coil and the second inductor coil are magnetized alternately.

In various embodiments the function may be achieved using a PMOS high-side pass-device, and an NMOS low-side pass-device.

In various embodiments the function may be achieved using multiple hide-side pass-device switches, and multiple low-side pass-device switches, to supply multiple outputs.

In various embodiments the function may be achieved using Boost type switching converter applications, as well as Buck-Boost type switching converter applications, in combination with Buck type switching converter applications.

DETAILED DESCRIPTION

The present disclosure describes a DC-DC switching converter, with a high magnetic coupling ratio between coils connected directly to a supply and ground, and pass-device switches connected directly to an output. The pass-device switches are driven in such a way that the coils are magnetized alternately. The DC-DC switching converter may use multiple output switches, to supply multiple outputs. The DC-DC switching converter may use different turns-ratio on the coils, to adjust the duty-cycle of the switching converter, for a given supply voltage to output voltage ratio.

When two inductors share a common core, the flux generated by one inductor flows through the other. The proportion of flux that circulates through both inductors defines the coupling ratio. If all the flux generated by one inductor flows through the other (and vice-versa), the inductors are completely coupled (100% coupling). Generally it is possible to design the inductors with coupling factors of anything between 0% and 100%. A high coupling factor would be much greater than 50%, generally greater than 80%. In the present disclosure, it is preferred to have a coupling factor of greater than 90%.

Figure 1:
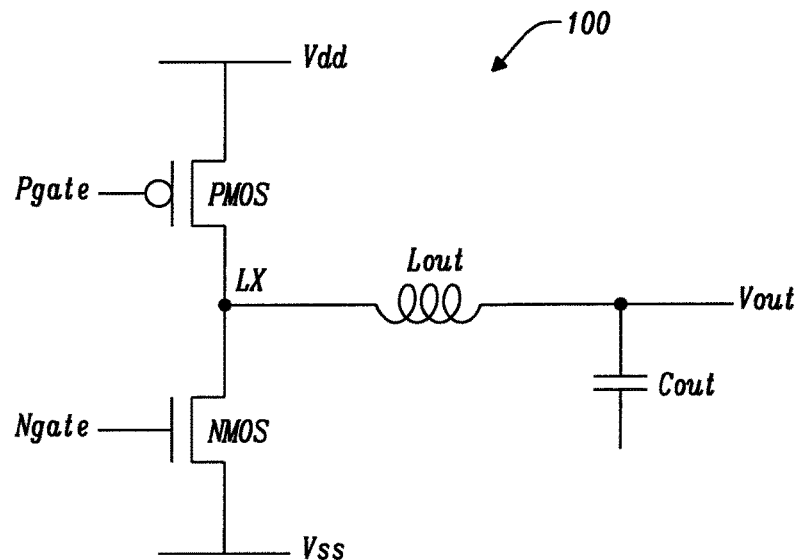
FIG. 1 illustrates a traditional DC-DC switching converter design, using two switches connected directly to the supply power and ground.
Figure 2:
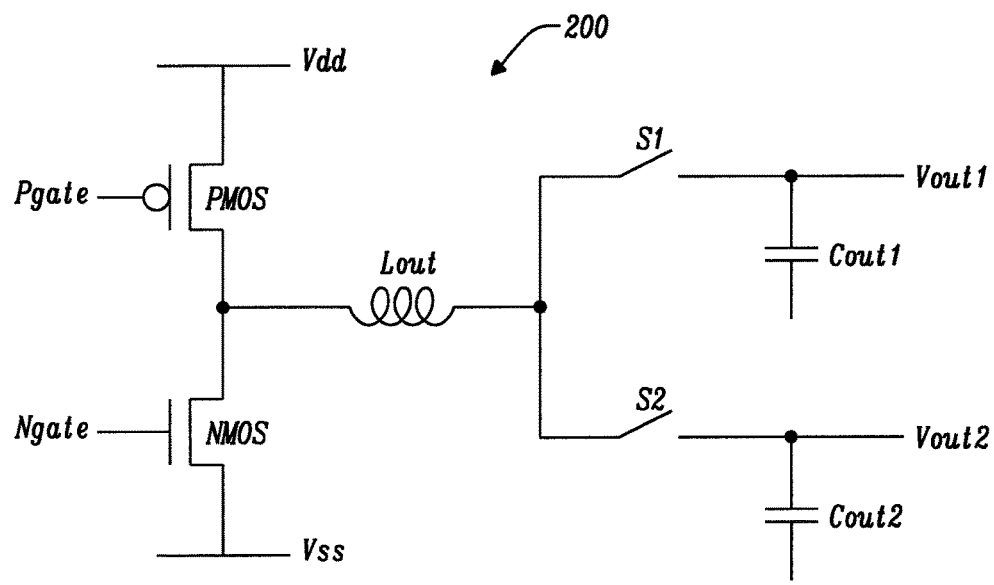
FIG. 2 shows an extension to the basic switching converter architecture, with a SIDO (Single-Inductor-Dual-Output) Buck switching converter.
Figure 3:
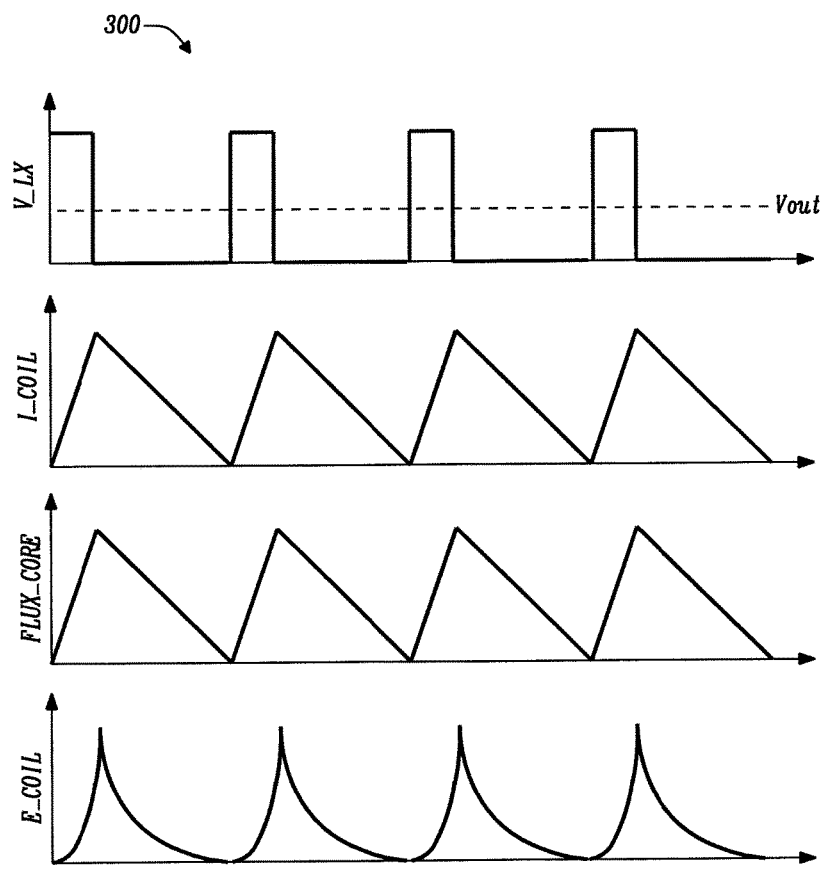
FIG. 3 illustrates waveforms for the traditional DC-DC switching converter of FIG. 1, forming a store of energy on the inductor coil.

FIG. 3 includes waveforms illustrating traditional DC-DC switching converter 300 of FIG. 1, forming a store of energy on the inductor coil. During the first stage of the cycle, high side device PMOS is on, and node LX is high. As voltage node V_LX is higher than output voltage Vout, the voltage across the coil is positive and coil current I_COIL ramps up. As the current ramps up, the flux in the magnetic core of the inductor, FLUX_CORE, increases. The energy in the inductor, E_COIL, increases with the square of the current.

During the second stage of the cycle, low side device NMOS is turned on, and high side device PMOS turned off. Voltage node V_LX node is now low, and lower than output voltage Vout, so coil current I_COIL starts to ramp down. In this stage of the cycle, the flux in the coil FLUX_CORE reduces, as it uses the stored energy in the inductor E_COIL to pull current out of ground, and supply it to the higher output voltage.

Figure 4:
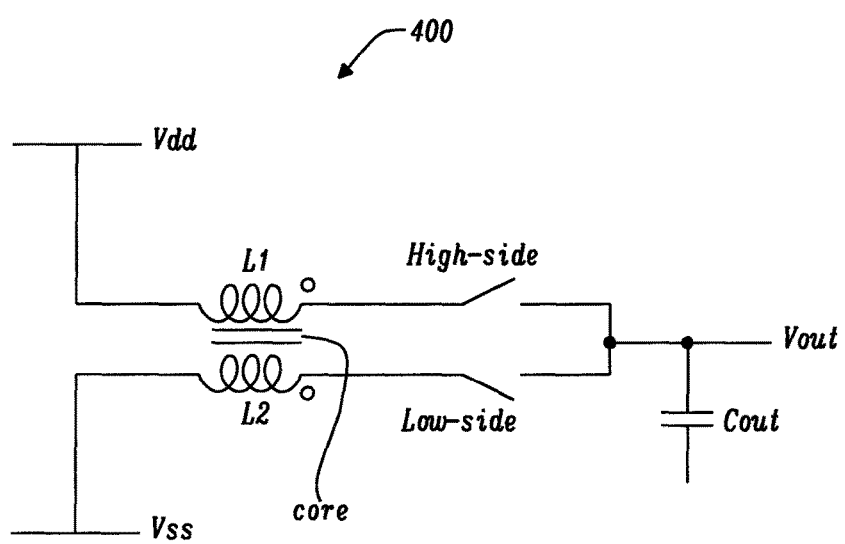
FIG. 4 shows a circuit diagram of a DC-DC switching converter, of the disclosure.

FIG. 4 shows circuit diagram 400, of a DC-DC switching converter of the disclosure. High-side and Low-side pass-device switches are moved from before coils L1 and L2, to a new location after the coils. The pass-device switches are now directly connected to output voltage Vout, across output capacitor Cout. Coils L1 and L2, having a shared core, are connected between supply power Vdd and ground Vss, and the High-side and Low-side pass-device switches, respectively. In order to maintain a similar DC-DC switching converter operation, where the coil forms a store of magnetic energy, charged during the high-side cycle and discharged during the low-side cycle, the coil must be split into two coils that are magnetically coupled with a high coupling factor.

Because the inductor is a store of magnetic energy, it is charged up during the High-side stage of the cycle and discharged during the Low-side stage of the cycle. The magnetic flux of the core is charged up during the High-side stage. During the Low-side stage, the magnetic energy of the coil is converted back to electrical energy. It is this transfer of energy that characterizes the switching converter operation and ensures high efficiency. During the second stage of the cycle, the switching converter pulls current from ground and supplies it to a higher potential.

Figure 5:
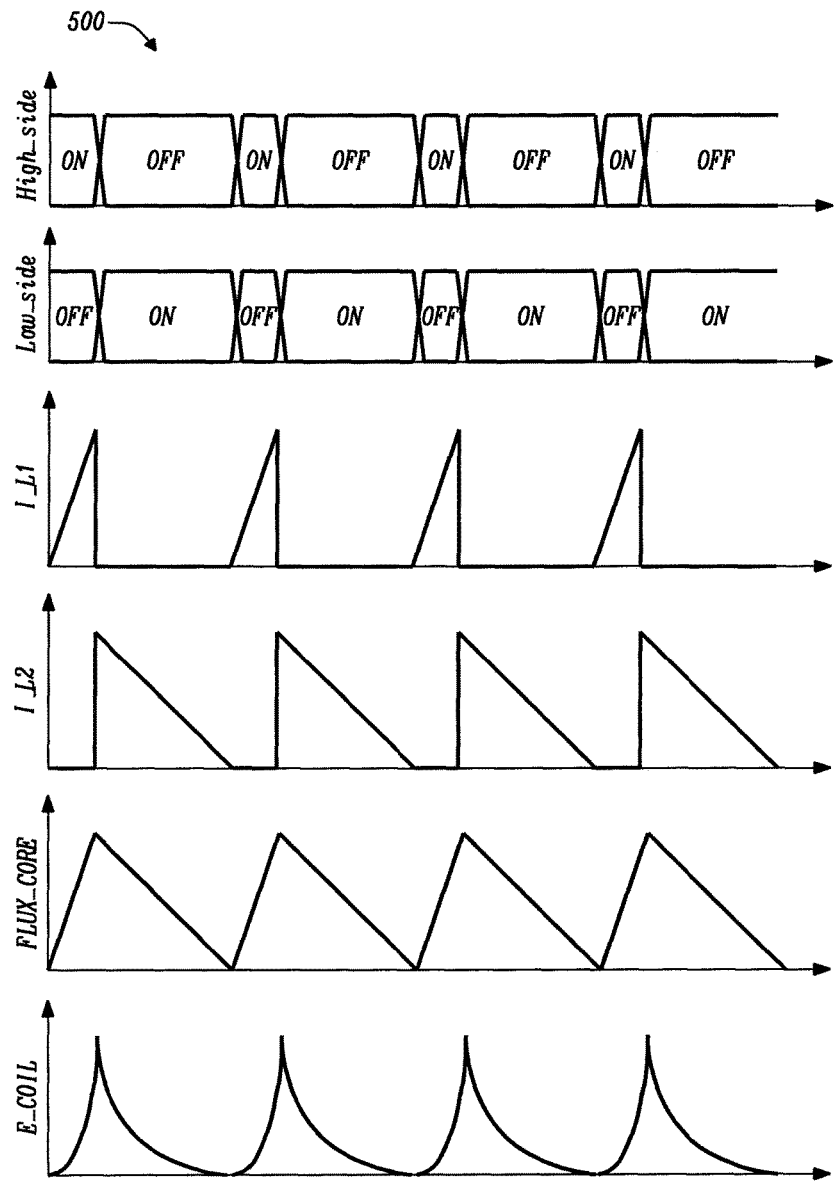
FIG. 5 illustrates a timing diagram and waveforms for inductors L1 and L2, of the DC-DC switching converter of FIG. 4, of the disclosure.

FIG. 5 illustrates timing diagram 500, for inductors L1 and L2 of the DC-DC switching converter of FIG. 4, of the disclosure. During the first stage of the cycle, High-side switch is on. In this stage the voltage across L1 is positive and current I_L1 increases. Low-side switch is off, and no current flows in I_L2. The inductance of L2 therefore offers no resistance to magnetic flux FLUX_CORE in the shared core, and the flux increases linearly proportional to current I_L1.

During the second stage of the cycle, Low-side switch is turned on, and High-side switch is turned off. The current I_L1 immediately goes to zero, and L1 now offers no resistance to flux FLUX_CORE in the shared magnetic core. The flux in FLUX_CORE now pulls current through L2, which is now connected between ground and the output. This causes L2 to supply current from ground to the output, even though the output voltage is higher than the ground potential.

In the first stage of the cycle, L1 causes the flux FLUX_CORE in the shared core to increase linearly with current I_L1. In the second stage of the cycle, flux FLUX_CORE causes current to flow in I_L2, and supplies current to the output at a higher potential than the source of the current at ground. L1 is used to charge up energy E_COIL stored in the shared magnetic core. L2 then converts this magnetic energy to electrical energy, in the form of current supplied to the output. It should therefore be clear that this circuit behaves in an analogous way to the traditional DC-DC switching converter.

Figure 6:
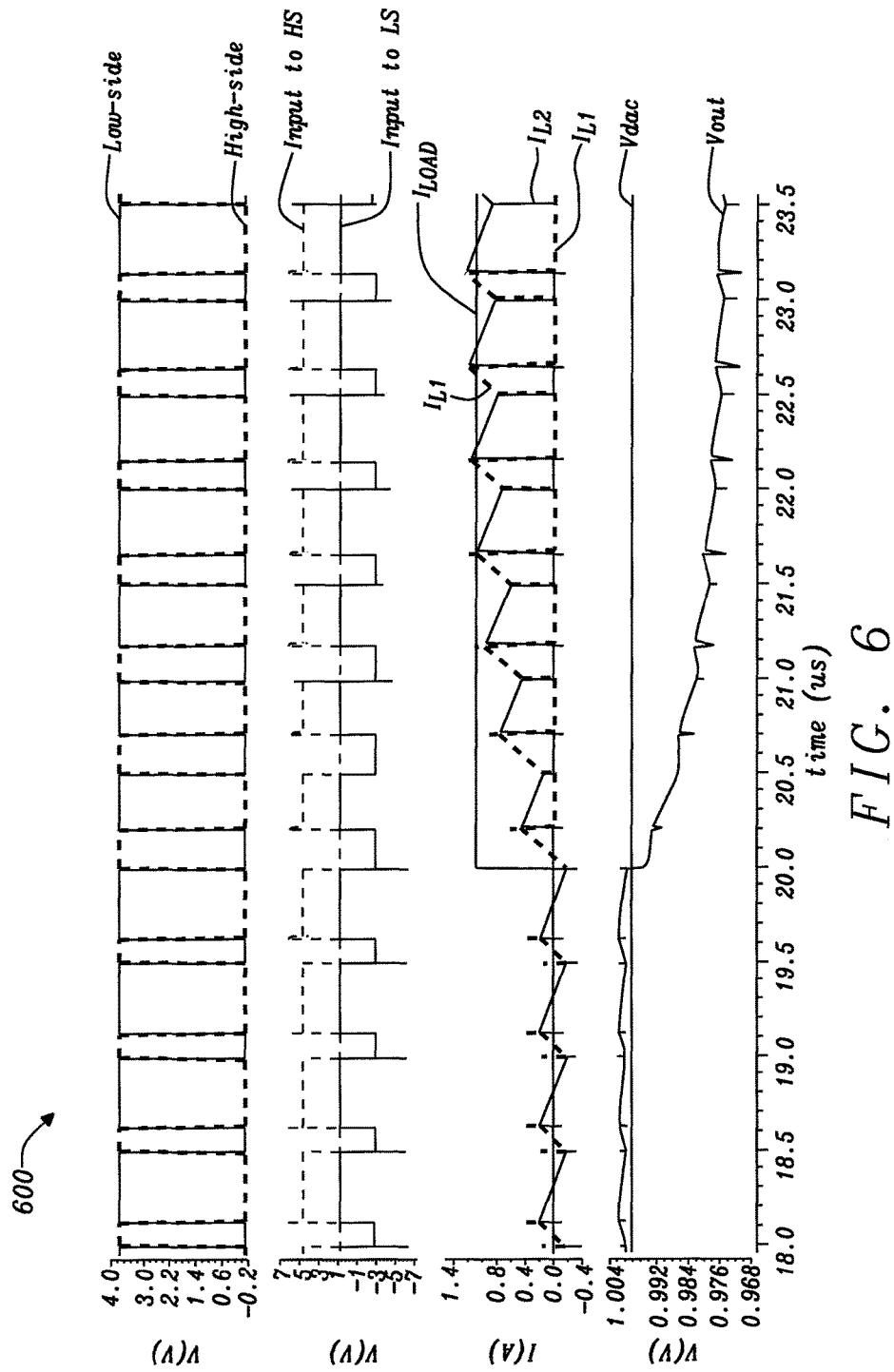
FIG. 6 shows a simulation model, for the basic operation of the DC-DC switching converter of the disclosure.

FIG. 6 shows simulation model 600, showing the basic operation of the DC-DC switching converter of the disclosure. The simulation is set for a target output voltage Vout of 1V, and a load transient step ILOAD of 1 A. The first panel shows the control signals for the High-side switch and the Low-side switch. The second panel shows the voltages between the switches and the coils, at the input to the switches. The input to the High-side switch node, Input to HS, goes low when the High-side switch is on, and high when the High-side switch is off.

The points being plotted in FIG. 6 are the points between the coil and the switch. First consider what happens when the High-side switch is on (closed). At this point the output of the coil is connected to the output (the output capacitor) and the voltage is therefore equal to the output voltage (in this case 1V). This is the case for both the Low-side and High-side plots. Then, the voltages when the switches are off (open) are driven by the back electromagnetic field (EMF). So there is 4V difference between the supply voltage and the output voltage. This will create a square wave on both Low-side and High-side nodes with 4V magnitude. As the Low-side node rises by 4V, the High-side node gets driven from 1V to 5V, by the induced back-EMF of the coupled coil. And likewise, as the High-side node falls from 5V to 1V, when the High-side switch turns on, the induced back-EMF of the coupled coil drives the Low-side node from 1V to −3V.

The input to the Low-side switch node, Input to LS, goes to ground when the Low-side switch is on, and goes negative when the Low-side switch is off. The third panel shows currents in the coils, I_L1 and I_L2 and load current ILOAD. The current in the high-side coil, I_L1, ramps up when the High-side switch is on, and goes immediately to zero when it turns off. The current in the Low-side coil, I_L2, is zero when the switch is off, then steps up when the switch initially turns on and ramps down. The 1 A load transient step of ILOAD is shown, along with the response of the switching converter, in the form of increasing currents I_L1 and I_L2, for several cycles after the load transient occurs. The fourth panel shows the output voltage Vout and the target voltage Vdac, and how the output voltage drops after the load transient.

One key reason why the architecture of the present disclosure is beneficial is that it is highly scalable to multiple outputs, and can be used to make high-efficiency SIMO (Single-Inductor-Multiple-Output) switching converters. Normally these types of switching converters require two switches in the signal path, which reduces efficiency. With the switching converter architecture of the disclosure, a SIMO only requires a single switch in the signal path, which will improve efficiency and reduce silicon area required to implement the design.

Figure 7:
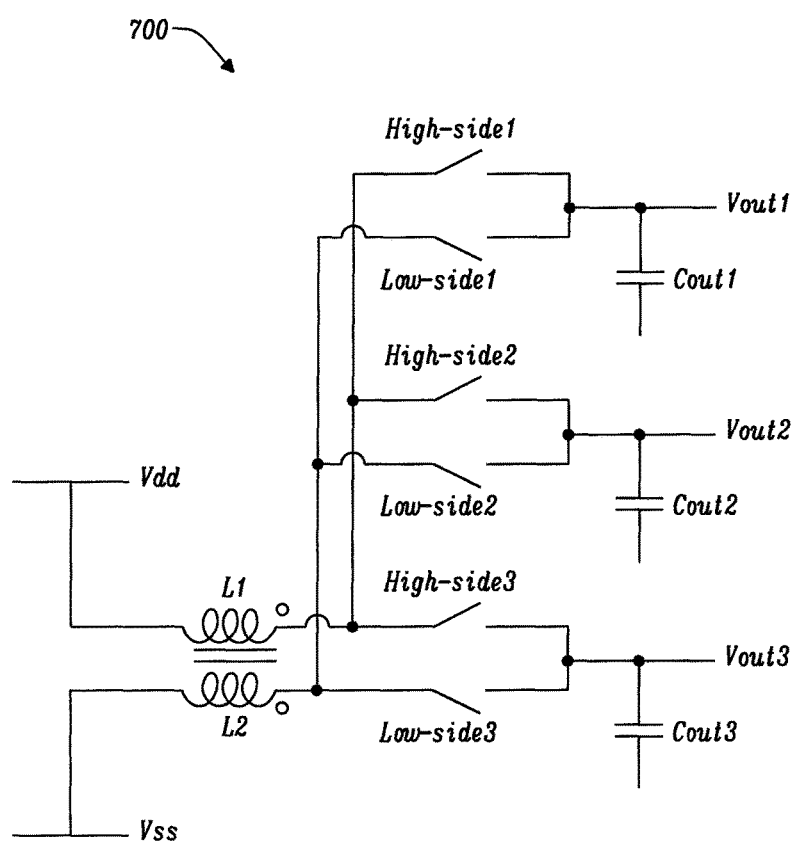
FIG. 7 illustrates high-efficiency a SIMO (Single-Inductor-Multiple-Output) DC-DC switching converter, a variation of the disclosure.

FIG. 7 illustrates high-efficiency SIMO (Single-Inductor-Multiple-Output) DC-DC switching converter 700, a variation of the disclosure. High-side n and Low-side n pass-device switches are located after coils L1 and L2, and are directly connected to the output voltages Vout n, across output capacitors Cout n. Coils L1 and L2 are connected between supply power Vdd and ground Vss, and High-side n and Low-side n pass-device switches, respectively.

The SIMO of FIG. 7 requires only a single switch, High-side n or Low-side n, in the signal path to each output voltage Vout n. This design can be modified using coils of different values and numbers of turns. A design using this scheme alters the duty cycle required for a given conversion ratio, of supply voltage Vdd to output voltage Vout n.

Figure 8:
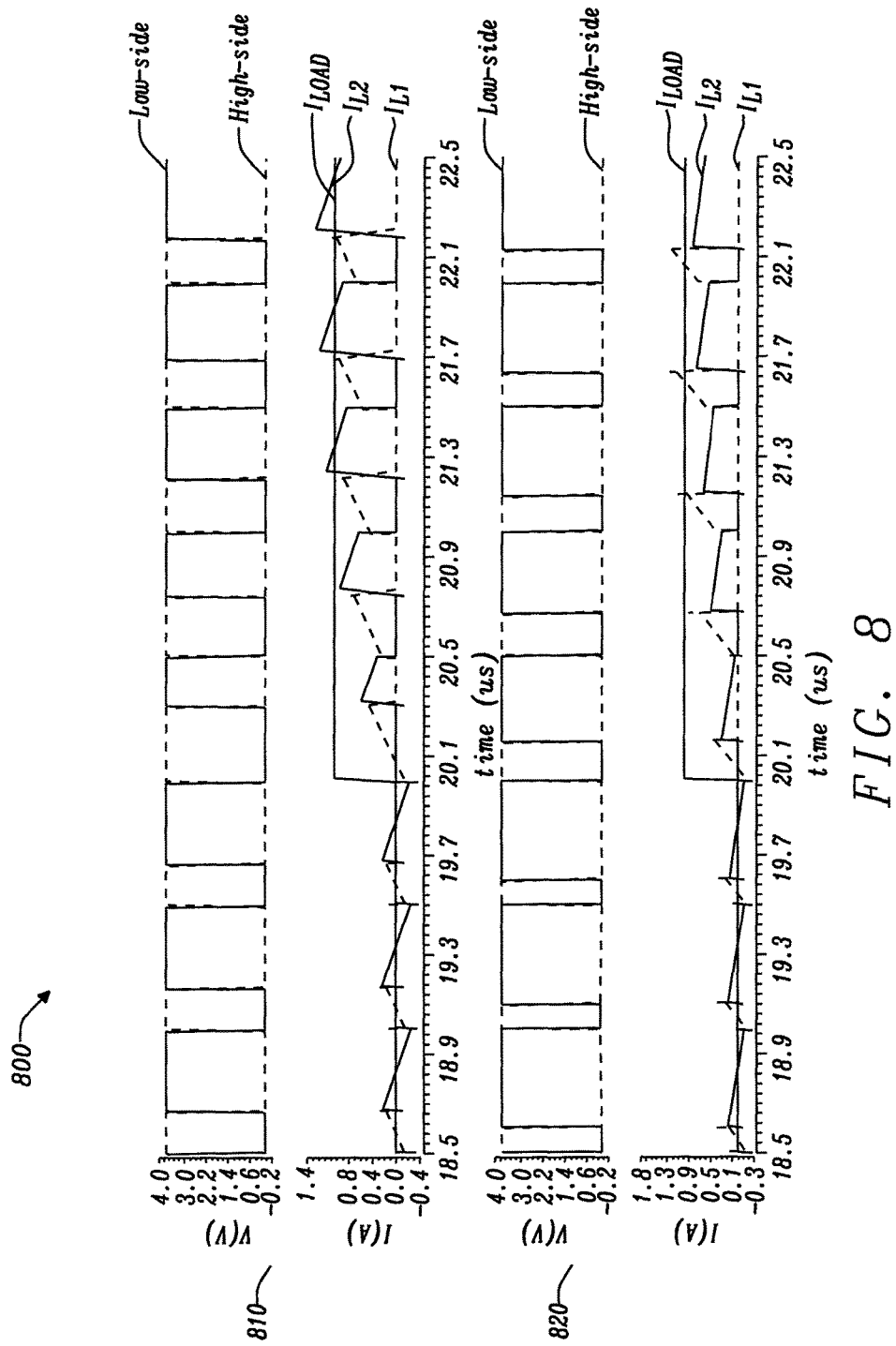
FIG. 8 shows simulation results for two different conversion ratios, of the disclosure.

FIG. 8 shows simulation results for two different conversion ratios, of the disclosure. For the simulation results, the supply voltage and the output voltage values were held constant, Vdd=3.8V and Vout=1V, respectively. In simulation 810, the high-side coil has twice as many turns as the low-side coil. In simulation 820, the low-side coil has twice as many turns as the high-side coil. In each simulation, the switch control signals are plotted on the upper panel, for High-side and Low-side switches. Coil currents I_L1 and I_L2 are shown on the lower panel, as well as load current ILOAD. In simulation 810, the duty cycle is greater than in simulation 820. It can clearly be seen that the High-side switch is on for longer each cycle in simulation 810. This effect could be used to increase the High-side on-time in circuits where the duty cycle is expected to be very small, and would make sampling the High-side current easier for current mode switching converters with a high conversion ratio.

Note that the principles of the present disclosure will work for Boost type applications, as well as Buck-Boost type switching converter applications, in combination with Buck type applications, described above. For example, current may flow through inductor L1 to an output lower than the supply voltage in a Buck type scheme, building up the flux of inductor L1. The flux of inductor L1 can then be used to deliver current to an output higher than the supply voltage, for current flow through inductor L2 in a Boost type scheme.

Figure 9:
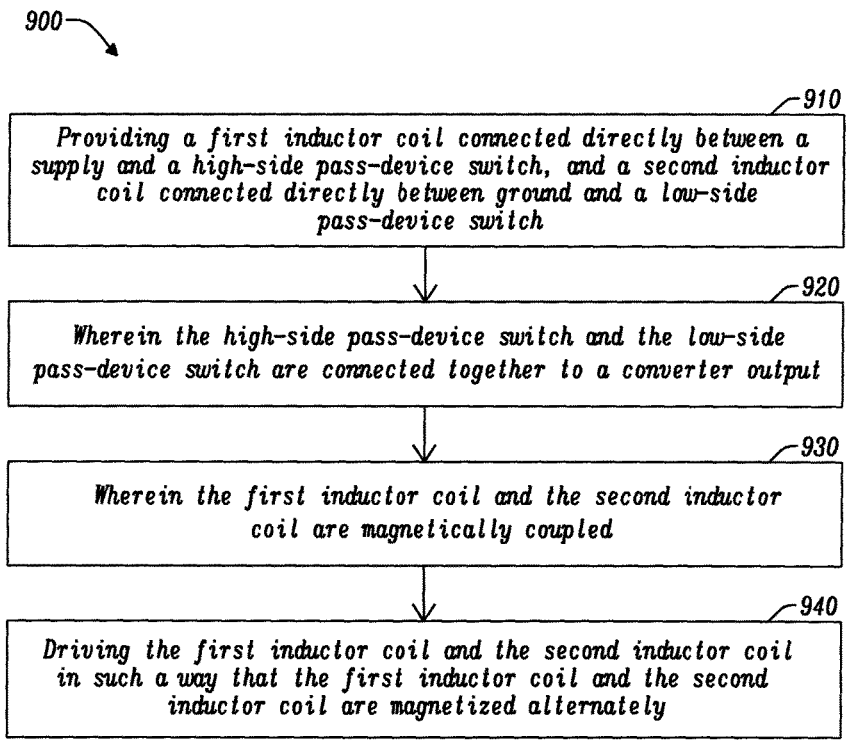
FIG. 9 illustrates a method for an output switched DC-DC switching converter.

FIG. 9 is flow chart 900, of a method for operating an output switched DC-DC switching converter. Step 910 provides for a first inductor coil connected directly between a supply and a high-side pass-device switch, and a second inductor coil connected directly between ground and a low-side pass-device switch. Step 920 provides for the high-side pass device switch and the low-side pass-device switch connected together to a converter output. Step 930 provides for the first inductor coil and the second inductor coil to be magnetically coupled. Step 940 provides for the first inductor coil and the second inductor coil driven in such a way that the first inductor coil and the second inductor coil are magnetized alternately.

The advantages of one or more embodiments of the present disclosure include providing high-efficiency SIMO switching converters, with smaller footprints. The disclosure also allows for the duty-cycle of the switching converter to be adjusted independently of the conversion ratio of the input voltage to the output voltage. There is additional savings in the number of switches and the flexibility of the duty-cycle of the DC-DC switching converter.

While this invention has been particularly shown and described with reference to the preferred embodiments thereof, it will be understood by those skilled in the art that various changes in form and details may be made without departing from the spirit and scope of the invention.

The invention claimed is:

1. An output switched DC-DC switching converter, comprising:
   a first inductor coil connected directly between a connection for a supply voltage and a high-side pass-device switch;
   a second inductor coil connected directly between a ground connection and a low-side pass-device switch;
   wherein one or more of said high-side pass-device switch and said low-side pass-device switch are connected together to a converter output;
   wherein said first inductor coil and said second inductor coil are magnetically coupled; and
   wherein said first inductor coil and said second inductor coil are configured to be alternately magnetized.

2. The output switched DC-DC switching converter of claim 1, wherein said first inductor coil and said second inductor coil have different turn-ratios, to provide for adjusting a duty-cycle of said switching converter to operate at a given supply-voltage to output-voltage ratio.

3. The output switched DC-DC switching converter of claim 1, wherein said first inductor coil and said second inductor coil are configured to form a store of magnetic energy, charged during the high-side pass-device turning on and discharged during the low-side pass-device turning on.

4. The output switched DC-DC switching converter of claim 1, wherein when said low-side device turns on, said switching converter is configured to pull current from ground, and to supply current to a higher potential.

5. The output switched DC-DC switching converter of claim 1, further comprising multiple hide-side pass-device switches, and multiple low-side pass-device switches, configured to supply multiple outputs.

6. The output switched DC-DC switching converter of claim 5, wherein one each of said multiple high-side pass-devices and said multiple low-side pass-device is connected to one of said multiple outputs.

7. The output switched DC-DC switching converter of claim 5, wherein all of said multiple high-side pass-devices and said multiple low-side pass-device are connected in common to said magnetically coupled first and second inductor coils.

8. The output switched DC-DC switching converter of claim 1, further comprising an output capacitor connected at said output.

9. The output switched DC-DC switching converter of claim 1, wherein said high-side pass-device is a PMOS device, and said low-side pass-device is an NMOS device.

10. The output switched DC-DC switching converter of claim 1, wherein said switching converter is a Buck type switching converter.

11. The output switched DC-DC switching converter of claim 1, wherein said switching converter is a Buck-Boost type switching converter.

12. The output switched DC-DC switching converter of claim 1, wherein said switching converter is a Boost type switching converter.

13. A method for operating an output switched DC-DC switching converter comprising:
- providing a first inductor coil connected directly between a supply and a high-side pass-device switch, and a second inductor coil connected directly between ground and a low-side pass-device switch;
- wherein one or more of said high-side pass-device switch and said low-side pass-device switch are connected together to a converter output;
- wherein said first inductor coil and said second inductor coil are magnetically coupled; and
- alternately magnetizing said first inductor coil and said second inductor coil.

14. The method of claim 13, further comprising adjusting a duty cycle of said switching converter with different turns-ratios between said first inductor coil and said second inductor coil, operating at a given supply-voltage to output-voltage ratio.

15. The method of claim 13, wherein said first inductor coil and said second inductor coil form a store of magnetic energy, charged during the high-side pass-device turning on and discharged during the low-side pass-device turning on.

16. The method of claim 13, wherein when said low-side device turns on, said switching converter pulls current from ground, and supplies current to a higher potential.

17. The method of claim 13, wherein said DC-DC switching converter employs multiple said hide-side pass-device switches, and multiple said low-side pass-device switches, to supply multiple said outputs.

* * * * *